United States Patent [19]
Nelson

[11] 3,834,370
[45] Sept. 10, 1974

[54] ASSEMBLY
[76] Inventor: John R. Nelson, Roby Rd., Stoughton, Wis. 53589
[22] Filed: Feb. 8, 1971
[21] Appl. No.: 113,387

[52] U.S. Cl.................. 126/137, 126/25 A, 126/30
[51] Int. Cl............................................. F24b 1/26
[58] Field of Search..................... 126/137, 25 A, 30

[56] References Cited
UNITED STATES PATENTS

| | | | |
|---|---|---|---|
| 2,573,115 | 10/1951 | Sisto | 126/25 A X |
| 2,608,149 | 8/1952 | Ellis | 126/25 A X |
| 2,781,037 | 2/1957 | Vuncannon | 126/25 A |
| 2,998,001 | 8/1961 | Lofgren et al. | 126/30 X |
| 3,111,123 | 11/1963 | Fort | 126/137 |
| 3,162,113 | 12/1964 | Tallaksen | 126/30 X |

Primary Examiner—Charles J. Myhre
Attorney, Agent, or Firm—John M. Diehl

[57] ABSTRACT

A grill for use in a fireplace or outdoors comprises a rack and pinion elevating assembly. A shaft which operates the pinion may be pushed to lock the elevating assembly and pulled to unlock the elevating assembly so that the grill may be raised or lowered. The grill may be tilted and latched in any one of several tilted positions.

11 Claims, 23 Drawing Figures

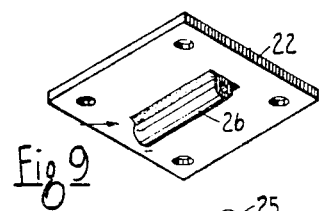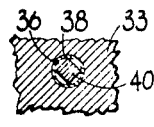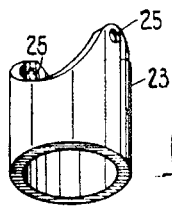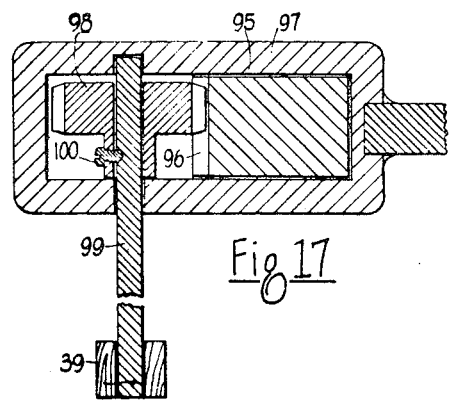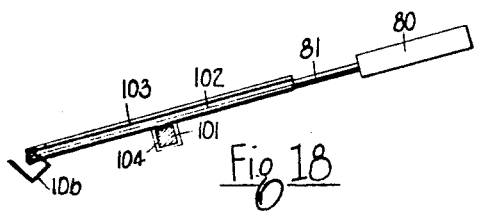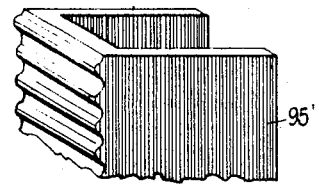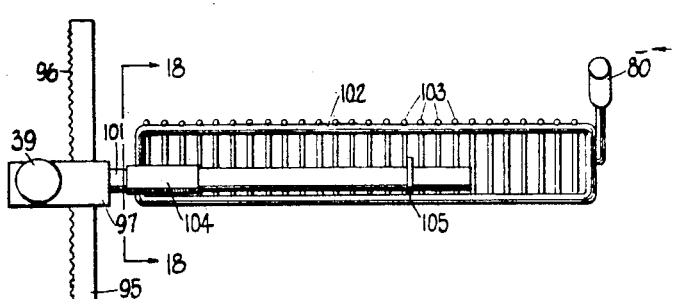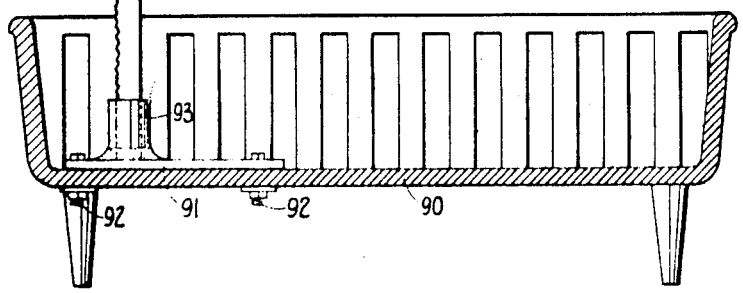

ASSEMBLY

FIELD

This invention relates to a barbecue grill and more particularly to a barbecue grill provided with a rack and pinion elevating mechanism which may be installed in fireplaces.

PRIOR ART

In U.S. Pat. No. 2,608,149 Ellis 99-421, there is described a grill and rotisserie-supporting device comprising a vertically extending screw member which is rotatable on a vertical axis. The device disclosed therein has a markedly different structure from that of the instant invention and it may be noted that if the device described therein were entirely installed within a fireplace, it would be necessary to insert an operator's hand into an area of potential high temperature in order to operate the device. Said device is shown as suitable for cooking over a bed of coals disposed in a fireplace, but it may be noted that the unique means of the present invention for supporting a grill in a fireplace is not shown therein.

Many disclosures, such as those in the following U.S. Pat. Nos. show grills supported in part from a stake driven in the ground but none of these shows the structure of the instant invention:

1,091,877 Collis
3,344,780 Anderson 126-30
3,261,344 Petrie 126-30
3,152,536 Lucas 99-397
3,195,531 Groff 126-30
3,162,113 Tallaksen 99-446
2,912,973 Lucas 126-30
2,844,139 Lucas 126-30

U.S. Pat. No. 2,523,200 Durst 126-137 shows a grill support member which may be installed in rotatable relationship to a fireplace with the support member in contact with the floor and ceiling of a fireplace but the unique and desirable features of the instant invention are not shown therein.

In U.S. Pat. Nos. 2,998,001 Lofgren et al. 126-25 and 3,395,692 Johns 126-30, grills are shown supported from basket grates which may be located within fireplaces, but the unique and desirable structure of the instant invention is not therein described.

SUMMARY

Whereas it has been heretofore proposed to provide grills installed within fireplaces, as discussed above and whereas it has been heretofore proposed to provide outdoor grills supported from a single upright member including grills supported from a member driven in the ground in the manner of a stake, as discussed above, it is believed that it has not heretofore been proposed to provide a grill which may be adjusted to any desired vertical position above a bed of charcoal or the like without limitations to a discrete number of preselected positions. Most previous grills have been positionable in a plurality of elevations above cooking means such as a bed of coals but have not been continuously adjustable throughout a selected range, from a minimum height to a maximum height.

Grills proposed heretofore have required that the operator place his hand on a portion of the grill or some member immediately adjacent the grill in order to adjust it. In utilizing such grills, operators have had to wear asbestos gloves or protect their hands in some equally effective manner in order to prevent being burned.

In the instant invention, the grill may be changed in elevation, tilted into any one of a number of desired positions, swung away from the fire and even removed entirely from its support without applying a hand or hands to any portion of the grill near the cooking surface. In short, all actions necessary to utilize the grill to the fullest desired degree may be carried out bare-handed without touching a hot or normally hot portion of the grill assembly.

Accordingly, a grill assembly is provided which is characterized by being readily mounted in a fireplace of any shape and also by being readily mounted outdoors. In a fireplace it may be mounted by utilization of characteristic attachment to the floor and ceiling of the fireplace or by suitable attachment to a basket grate. Outdoors it may be mounted by utilizing a stake member which may be provided as a portion of the assembly or by utilizing a socket member which may be similar to that utilized in conjunction with a basket grate. The grill may be raised or lowered by operation of a rack and pinion mechanism associated with a vertical support for the grill and the grill itself in a preferred embodiment may be tilted into any one of a number of desired positions of tilt and latched in such desired position by the use of suitable controls hereinbelow described of these operations and also entire removal of the grill from above the fire or entirely from its support, may be accomplished through the use of suitable controls which may be operated at a distance remote from the normally hot portions of the grill assembly and from the fire itself and thus may be operated by an operator without providing protection for his hands.

OBJECTS

It is therefore an object of the invention to provide an improved grill assembly as herein described.

Other objects will become apparent from the drawings and from the following detailed description in which it is intended to illustrate the applicability of the invention without thereby limiting its scope to less than that of all equivalents which will be apparent to one skilled in the art.

DRAWINGS

In the drawings, like reference numerals refer to like parts and:

FIG. 3 is a fragmentary cross-sectional view taken on lines 3—3 in FIG. 2;

FIG. 4 is a cross-sectional view taken on lines 4—4 in FIG. 2;

FIG. 5 is a cross-sectional view corresponding to FIG. 4 showing a modification of the embodiment of FIG. 4;

FIG. 9 is a perspective view of a portion of the embodiment of FIG. 6;

FIG. 10 is a perspective view of another portion of the embodiment of FIG. 6;

FIG. 16 is a partially cross-sectional elevation of another embodiment;

FIG. 17 is a cross-sectional view of a portion of the embodiment of FIG. 16;

FIG. 18 is a cross-sectional view taken on lines 18—18 in FIG. 16;

FIG. 19 is a fragmentary perspective view of a modification of part 96 in FIG. 16;

DESCRIPTION

Figure 1:
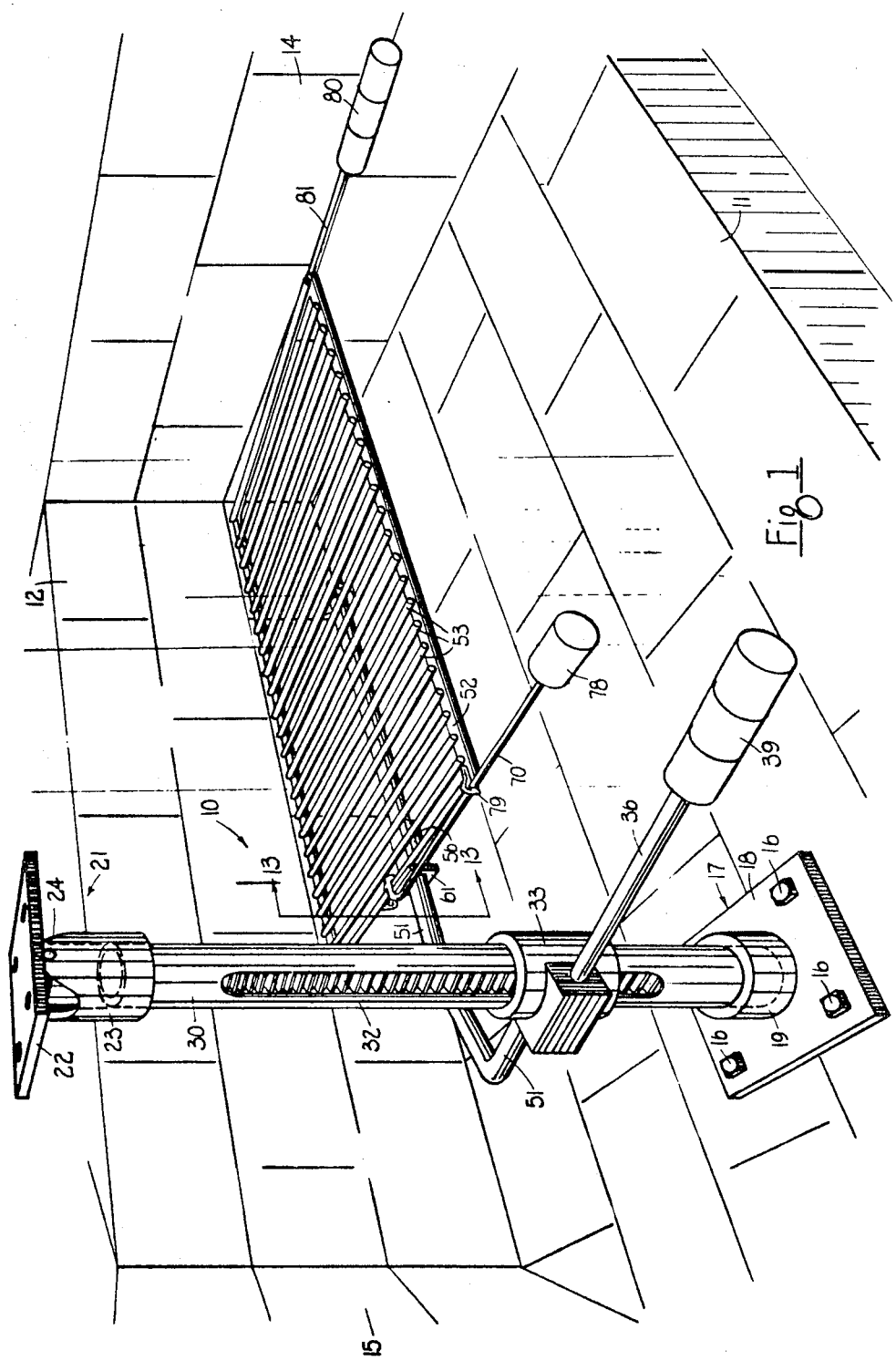
FIG. 1 is a perspective view of one embodiment of the invention.
Figure 2:
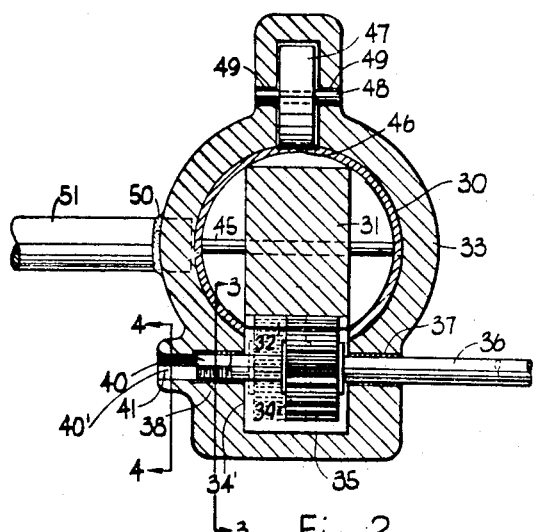
FIG. 2 is a cross-sectional view of a portion of the embodiment of FIG. 1.
Figure 6:
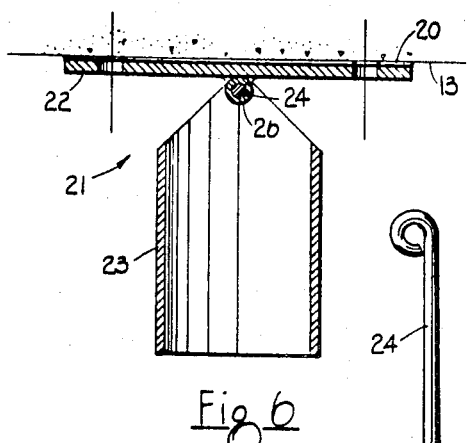
FIG. 6 is a cross-sectional elevation of a part of the embodiment of FIG. 1, showing a socket member in accordance with the invention.
Figure 8:
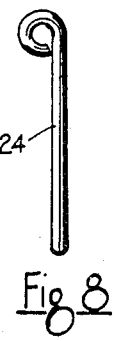
FIG. 8 is a plan view of part 24 of the embodiment of FIG. 6.
Figure 7:
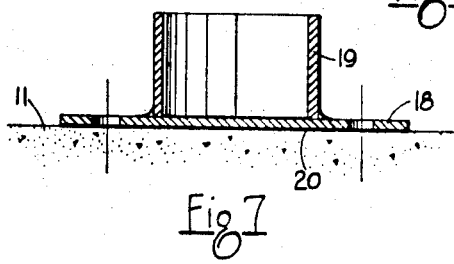
FIG. 7 is a cross-sectional elevation of a part of the embodiment of FIG. 1, showing a lower socket member in accordance with the invention.

Referring now to FIGS. 1 to 4 and 6 to 10, there is shown a grill assembly indicated generally as 10 installed in a fireplace having bottom or floor 11, back or rear wall 12, ceiling or overhead 13 and right side or sidewall 14 and left side or sidewall 15. Attached to floor 11 with lag screws 16 or by any other suitable means such as fire resistant cement 20 or the like, there may be provided a first or lower socket member indicated generally as 17 which may comprise base plate 18 and socket portion 19 extending upwardly therefrom. A second or upper socket member indicated generally as 21 may be attached to ceiling 13 with cement 20 or with bolts such as bolts 16 if desired. Socket member 21 may comprise base portion 22 and socket portion 23 which may be hingedly attached to base portion 22 by hinge pin 24 extending through holes 25 in member 23 and through tube 26 attached, as by welding, to base 22.

Received in socket members 17 and 21, or more specifically socket portions 19 and 23 of socket members 17 and 21 respectively, there may be provided an upright member which may comprise tubular portion 30 and a rack portion 31 (received in the tubular portion) which may have rack teeth 32 on one side. Member 30 is received both slidably and rotatably in socket portions 19 and 23 so that the grill as described hereinafter, may be swung from its normal cooking position within the fireplace into the space in front of the fireplace by rotation of member 30 in socket portions 23 and 19. Member 30 does not extend as far upwardly in portion 23 as it could and the distance it may travel upwardly into portion 23 after being installed as shown is made greater than the distance it extends downwardly into member 19 so that by forcing it upwardly into position 23, the bottom portion of member 30 is freed from restraint by portion 19 and may be swung outwardly so that the top may then be withdrawn from portion 23 to thereby remove the upright member comprising portions 30 and 31 and the grill attached thereto entirely from within the fireplace.

Slidably received on member 30, there may be provided collar member 33 which may have received therein pinion 34 which may have teeth 35 which engage with teeth 32. Pinion 34 may be mounted on shaft 36 which may be received in collar 33, bushings 37 and 38 being provided to minimize friction when shaft 36 is rotated as it may be by turning handle 39 attached thereto. The end of shaft 36 as indicated at 40 may be made square. A corresponding square tubular portion 41 may be provided to the left of bushing 38 as viewed in FIG. 2 so that when shaft 36 is pushed to the left, to the position shown in dashed lines at 40', pinion 34 is also moved to the left to the position shown in dashed lines at 34'. Square portion 40 of shaft 36 is then received in rectangular tubular portion 41 of collar member 33 and thereby shaft 36 is prevented from rotating and thus collar member 33 is prevented from sliding downwardly on member 30.

It is only necessary to provide one flat portion (or non-round portion) on the end of shaft in place of square portion 40 and a corresponding tubular portion to receive the end of the shaft, in place of portion 41, instead of being square, may have the configuration indicated at 41' in FIG. 5.

Pins 45 may be provided to hold member 31 in position within member 30.

A portion of member 30 may be flattened as indicated at 46 and a roller member 47 may be provided received within collar member 33. Roller member 47 may be mounted on shaft 48 which may be received in bushings 49. Roller 47 may act against flat portion 46 of member 30 to reduce friction of collar 33 in moving upwardly and downwardly on member 30.

Connected to member 33, as by welding as indicated at 50, there may be provided laterally extending grill support member 51.

Referring now to FIGS. 1 and 11–15, a grill in accordance with the invention may suitably consist of a border wire 52 and a plurality of parallel wires 53 which may be disposed to support objects to be cooked. Wires 53 may be attached as by welding at each end as indicated at 54 to border wire 52 and preferably extend as shown, that is, toward the front and rear of the fireplace so that by tilting the grill as described hereinafter, grease from meat cooked on the grill runs along the wires toward the front or rear depending on the direction of tilt. Border wire 52 may be welded at 55 to collar or tubular member 56 which may be slidably and rotatably received on grill support member 51 and bracket 57 may be welded to one of wires 53 at 58 and may be provided with a hole 59 in which member 51 may be received. Thus the grill may be supported from grill support member 51.

To provide for rotating the grill around member 51 and maintaining it in various rotated positions so that wires 53 have various degrees of slant to facilitate allowing grease to run along the wires so that it may be collected at the rear or front, there may be provided projection 60 and collar 61 both rigidly attached to member 51 and collars 56 may be provided with longitudinal slot 62, lateral slot 63 and notches 64 extending longitudinally from lateral slot 63. Slots 62 and 63 and notches 64 may be of suitable size to receive projection 60. Wire member 70 may be provided as shown, being bent at 71, 72, 73 and 74, hingedly attached to projection 77' extending from wire 52 and then bent at 77 and provided with handle 78. Hook 79 may be provided extending from the grill. Wire member 70 may be secured under hook 79 to hold member 70 in place.

Figure 11:
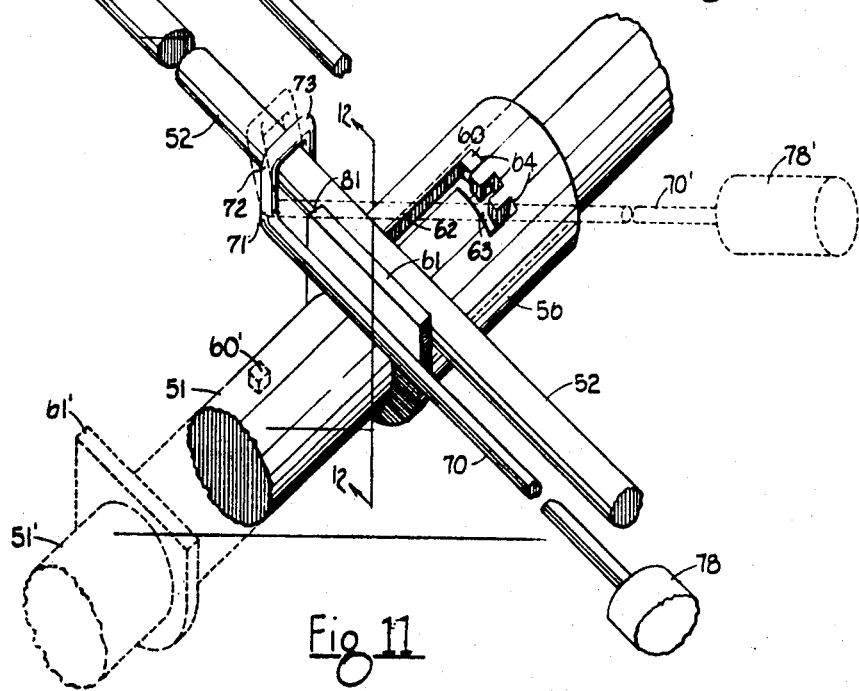
FIG. 11 is a partially fragmentary, partially cross-sectional, partially cut away view of a portion of the embodiment of FIG. 1.
Figure 12:
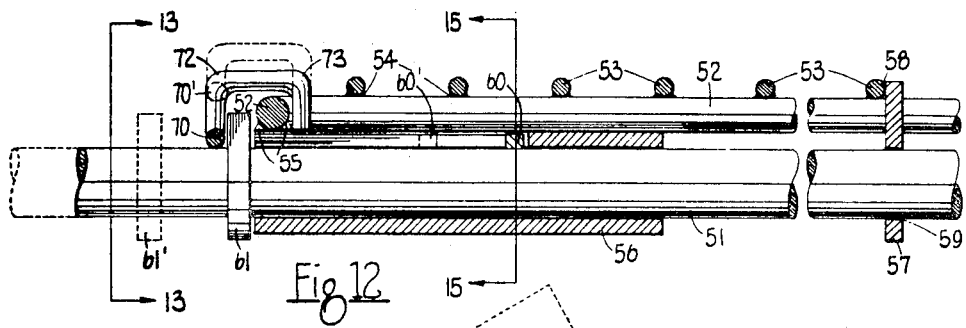
FIG. 12 is a cross-sectional view taken on lines 12—12 in FIG. 11.
Figure 13:
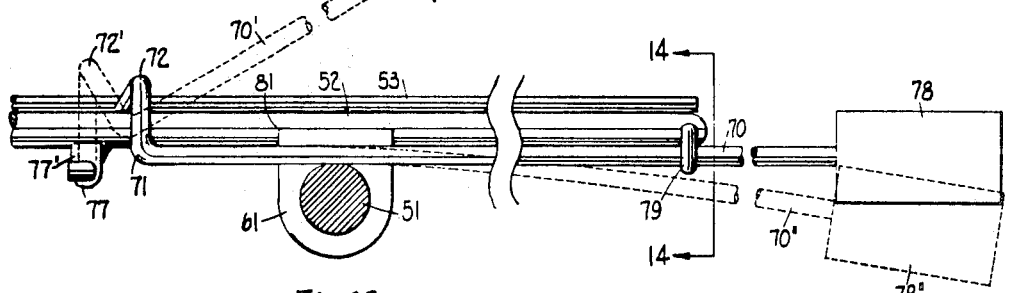
FIG. 13 is a cross-sectional view taken on lines 13—13 in FIGS. 1 and 12.
Figure 14:
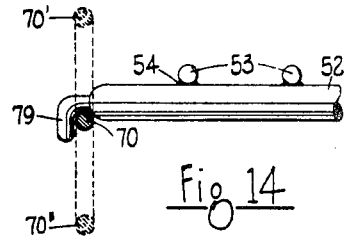
FIG. 14 is a cross-sectional view taken on lines 14—14 in FIG. 13.
Figure 15:
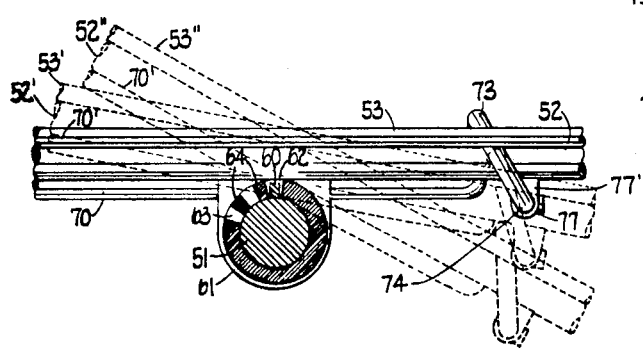
FIG. 15 is a cross-sectional view taken on lines 15—15 in FIG. 12.

In order to tilt the grill one way first push down on handle 78 to spring member 70 loose from hook 79 as shown in dashed lines in FIG. 13: handle 78 is pushed downwardly until it occupies the position shown at 78'' and member 70 occupies the position shown at 70''. Member 70 may then be raised upwardly by use of handle 78 until it occupies the position shown for at 70 and 70' and for handle 78 at 78' as shown in each of FIGS. 11, 12, 13, 14 and 15. As shown in FIGS. 11 and 13, member 70 is raised until it clears the corner of collar 61 at 81. The grill may then be slid outwardly so that it occupies the position with respect to collar 61 and projection 60 that is indicated in dashed lines at 60' and 61' (FIGS. 11 and 12). If sliding in this manner is continued, the grill may be entirely removed from support 51 in order to make it possible to clean the grill and the like. If, however, it is merely desired to tilt the grill, it is first positioned on member 51 so that projection 60 will travel in slot 63 and it is then rotated, by use of handle 80 attached to member 81 which extends from the end of the grill which is furthest from collar 33, until member 60 is opposite that one of notches 64 which will provide the desired degree of tilt. The grill is then slid on member 51 toward collar 33 until collar 61 seats against collar member 56 and wire 52 whereby the grill is maintained in a tilted position as shown in FIG. 15 for members 52 and 53 wherein members 52 and 53 are shown in dashed lines as indicated at 52' and 53' in a tilted position. In order to retain the grill in this position, wire 70 may again be locked in place by pressing it downward into the position shown at 70'' in FIG. 13 and then positioning it under hook 79 and releasing it so that it occupies the position shown in full lines for member 70 in FIGS. 11, 12, 13 and 14 whereupon by reason of the action of wire 70 against collar 61, the grill is prevented from sliding in the direction opposite from collar 33 and thereby is retained in the tilted position by reason of member 60 being retained in a desired notch 64. Another suitable tilted position of the grill is indicated in FIG. 15 by members 52'' and 53''.

Referring now to FIGS. 16, 17 and 18, another embodiment is shown wherein a device in accordance with the invention is provided attached to a basket grate which may be placed in a fireplace. As shown, socket member 91 may be attached to basket grate 90 with bolts 92. Member 91 is provided with a vertically extended socket portion 93 in which there is received an upwardly extending rack member 95 which may be a solid rectangular metal member provided with rack teeth 96 on one side. Slidably received on member 95 there may be provided collar member 97 as shown. Handle 39 may be attached to the end of shaft 99. Grill support 101 which may be rectangular in cross-section may extend laterally from collar 97. The grill which may comprise border wire 102 having forwardly and rearwardly extending parallel wires 103 attached thereto, to support meat and like objects to be cooked, may be attached to member 101 by slidable collar members 104 and 105 slidably received on member 101. Collars 104 and 105 may be attached to the grill 70 in any suitable manner; for example, as shown, they may be welded to members 102 and 103 and may have rectangular holes therein which receive rectangular member 101 so that tilting with respect to member 101 is prevented. Member 101 may be mounted so that a suitable degree of tilt is provided. As shown in FIG. 18 a drip trough 106 of conventional structure may be hooked to border 102 and may collect grease which runs downwardly along wires 103. Handle 80 attached to member 81 extending from the grill may be provided in the same manner and for the same reason as provided in previously described embodiments.

Another modification is shown in FIG. 19: in place of a vertically extending member 95 which is solid, a suitable vertically extending rack member 95' may be provided which has the form of a channel provided with rack teeth.

Figure 20:
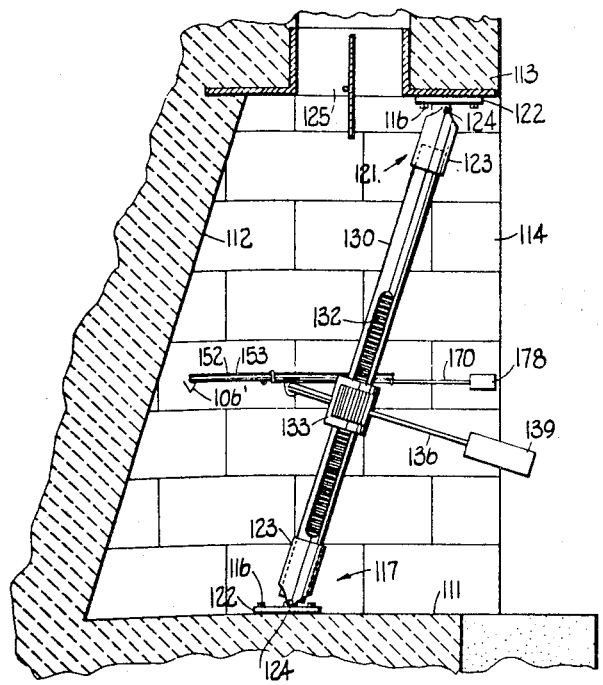
FIG. 20 is a cross-sectional elevation of a preferred embodiment in accordance with the invention.

Referring now to FIG. 20, it may be seen that in accordance with a modification of the embodiment of FIG. 1, a device in accordance with the invention may be installed in a fireplace having a rear wall 112 which slopes forward to a pronounced degree. The fireplace of which wall 112 is the rear wall may comprise floor 111, ceiling 113, right wall 114 and flue 125. Installed in the fireplace there may be provided a device in accordance with the invention comprising upwardly extending member 130 which may correspond to member 130 and may have associated therewith a rack member having rack 132 which may correspond to teeth 32. Member 130 may extend upwardly at an acute angle to floor 111. The grill may be supported from member 130 in the same manner as the grill of FIG. 1 is supported from member 30. The grill may comprise border wire 152, which may correspond to border wire 52 and wires 152 extending forwardly and rearwardly which may be attached to border wire 152 and may correspond to wires 53. Trough 106' to catch grease may be provided in the same manner and for the same purpose as described in connection with FIG. 18. Collar 133 may be provided, received on member 130 and containing a pinion with teeth to engage teeth 132 in the same manner as described in conjunction with the device of FIG. 1 and handle 139, which may correspond to handle 39, may be operated to rotate shaft 136 which may correspond to shaft 36 to cause collar 133 to move upwardly and downwardly on members 133 and 130 to raise and to lower the grill. It may be noted that the grill does not travel vertically, but travels upwardly and downwardly in a slanted path which may correspond to the slant of wall 112. Member 130 may be installed and supported within the fireplace in a manner similar to the manner in which member 30 is installed in the fireplace of FIG. 1, thus the ends of member 130 may be received in upper and lower socket members 121 and 117 respectively, which may correspond to members 21 and 17 respectively. Member 121 may, in fact, by identical with member 21 and may comprise parts 116, 122, 123 and 124, which may be identical respectively with parts 16, 22, 23 and 24 with member 123 being hingedly supported in angular relationship with member 122. Member 117, rather than being similar in construction to member 17, is preferably similar to, or identical in construction to, member 121 and may comprise parts 116, 122 and 123, which may be identical to the correspondingly numbered parts of member 121.

Member 130 may be removed from the position shown in FIG. 20 and thereby removed from the fireplace in the same manner as hereinbefore described for the removal of member 30 from supporting devices 17 and 21.

Figure 21:
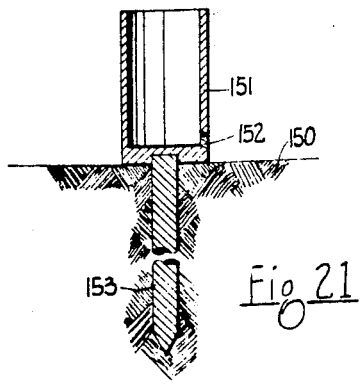
FIG. 21 is a cross-sectional elevation of a portion of a modified embodiment.

Rather than being installed in a fireplace, a device in accordance with the invention may be installed outdoors by utilizing a supporting assembly as shown in FIG. 21, wherein stake 153 may have socket member 151 attached thereto and may be driven into ground or earth 150. Member 95 or member 30 or member 130 may be inserted in socket portion 151 in the same manner as it is inserted in and supported by socket portions 93 or 17. Drain hole 152 may be provided in socket portion 151 to allow rain water which otherwise might collect therein to drain therefrom.

Figure 22:
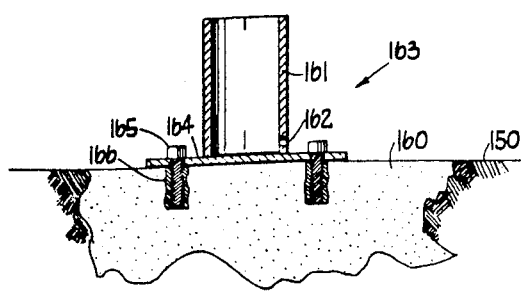
FIG. 22 is a cross-sectional elevation of a modification of the embodiment of FIG. 21.

An alternative device for supporting a device in accordance with the invention outdoors rather than in a fireplace is shown in FIG. 22 wherein the device indicated generally as 163 comprises base 164 and socket member 161 and is attached to rock 160 embedded in earth or ground 150 by bolts 165 embedded in cement 166. A drain hole 162 may be provided to drain rainwater from portion 161 in the same manner that drain hole 152 is provided for member 151.

Members 95, 30 or 130 may be received in socket portion 161 in the same manner as in portion 17 or 93 or 151 in order to support the device of the invention.

Figure 23:
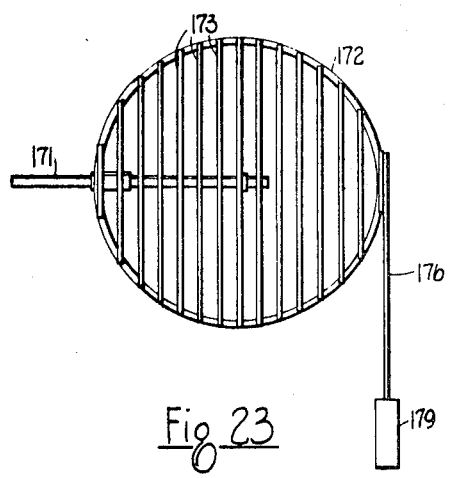
FIG. 23 is a plan view of a modified form of grill which may constitute a portion of the assembly of the invention.

As may be seen from FIG. 23, a grill to be used as a portion of the assembly of the invention may be round in plan view rather than being rectangular and, in fact, may be any other desired shape. The grill of FIG. 23 is found especially suitable for use in fireplaces having a hearth or a hood which is round or circular in plan view and it may comprise border wire 172 and wires 173 extending forwardly and backwardly, which may support an object to be cooked, and may be attached to border wire 172. The grill may be supported from laterally extending grill support member 171 in the same or similar manner to other embodiments; member 171 may correspond to member 101 or member 51. Extending wire or rod 176 and handle 179 may be provided for the same purpose as, and may correspond respectively to, rod 170 or 81 and handle 178 or 80.

Any one of the embodiments of FIGS. 1, 16 and 20 may be installed in a fireplace built around a prefabricated steel liner such as is sold commercially under the registered trademark, "Heatilator," rather than being installed in a fireplace of so-called conventional construction, i.e., on which has a rear wall and side walls faced with fire brick as shown in the figures.

It may thus be seen that the invention is broad in scope and includes such modifications as will be apparent to those skilled in the art and is to be limited only by the claims.

Having thus described my invention, I claim:

1. In a grill assembly for cooking meats and the like, the combination of:
    an upwardly extending member having a lower end and an upper end,
    said upwardly extending member comprising a rack,
    means at least at said lower end for supporting said upwardly extending member in a substantially vertical position,
    a collar member,
    said collar member slidably received on said upwardly extending member,
    said collar member having a pinion received therein,
    said collar member having a shaft received therein,
    said shaft attached to said pinion,
    said pinion engaged with said rack,
    a handle attached to said shaft,
    a laterally extending grill support member attached to said collar member,
    a grill supported from said grill support member,
    said grill comprising a plurality of parallel wires extending toward the front and rear,
    a member extending fron said grill toward the front,
    said extending member provided with a handle.

2. The assembly of claim 1 wherein:
    said member is supported from a fireplace basket grate.

3. In the assembly of claim 1:
    a lower socket member attached to a floor portion of a fireplace,
    an upper socket member attached to an overhead portion of a fireplace,
    at least one of said socket members comprising a base portion and a socket portion, said member received rotatably in said socket members and extendable further upwardly into said upper socket a distance greater than the distance extended into said lower socket member.

4. In the assembly of claim 1:
    said shaft slidably received in said collar member and said pinion,
    said shaft provided with at least one flat face on the end thereof which is received in said collar member,
    said flat face engageable with a corresponding flat face in said collar member to prevent rotation of said shaft.

5. In the assembly of claim 1:
    said upwardly extending member comprising a tubular member and a rectangular rack member,
    said rack member received in said tubular member,
    said tubular member provided with a slot adjacent the teeth of the rack of said rack member,
    said pinion extending through said slot to engage said rack member.

6. In the assembly of claim 5:
    said shaft slidably received in said collar member and said pinion,
    said shaft provided with at least one flat face on the end thereof which is received in said collar member,
    said flat face engageable with a corresponding flat face in said collar member to prevent rotation of said shaft.

7. In the assembly of claim 1:
    said handle member attached to said grill at the end of said grill most remote from said collar member.

8. In the assembly of claim 1:

said grill supported to rotate on said grill support member on an axis extending generally from one side of the fireplace to the other side of the fireplace, and means to arrest said rotation.

9. In the assembly of claim 8:
said means to arrest said rotation comprising a collar received on said grill support member,
said grill support member comprising a cylindrical portion receiving said collar,
said collar slidable as well as rotatable on said grill support member,
said grill attached to said collar,
a projection on said support member, notches in said collar,
each of said notches adapted to receive said projection,
handle means extending from said grill to move the grill and rotate and slide the collar on the support member.

10. In the assembly of claim 1:
said upwardly extending member supported within a fireplace,
being supported at its lower end from the floor of said fireplace, and
being supported at its upper end from an upper portion of said fireplace
said upwardly extending member extending upwardly from said floor at an acute angle to said floor.

11. In the assembly of claim 10:
said fireplace having a rear wall,
said rear wall sloping forwardly,
said upwardly extending member sloping forwardly in the same manner as said rear wall.

* * * * *